(12) United States Patent
Filachek et al.

(10) Patent No.: US 9,547,582 B2
(45) Date of Patent: Jan. 17, 2017

(54) SELECTABLE DATA ON FILE VIEWING IN A DEBUGGER

(71) Applicant: International Business Machines Corporation, Armonk, NY (US)

(72) Inventors: Christopher D. Filachek, Lagrangeville, NY (US); Adris E. Hoyos, Poughkeepsie, NY (US); Joshua B. Wisniewski, Elizaville, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/600,238

(22) Filed: Jan. 20, 2015

(65) Prior Publication Data

US 2016/0210220 A1   Jul. 21, 2016

(51) Int. Cl.
G06F 9/45 (2006.01)
G06F 9/44 (2006.01)
G06F 11/36 (2006.01)

(52) U.S. Cl.
CPC ......... G06F 11/3664 (2013.01); G06F 11/362 (2013.01); G06F 11/366 (2013.01); G06F 11/3612 (2013.01); *G06F 11/3636* (2013.01)

(58) Field of Classification Search
CPC .... H04L 67/14; G06F 11/362; G06F 11/3664; G06F 11/366; G06F 11/079; G06F 11/3636; G06F 11/3466; G06F 11/3612
See application file for complete search history.

(56) References Cited

U.S. PATENT DOCUMENTS 7,426,717 B1 *  9/2008  Schang ............... G06F 11/3664
                                                         714/E11.207
7,873,872 B1 *  1/2011  Shillington ......... G06F 11/3664
                                                         717/124

(Continued)

OTHER PUBLICATIONS

Gail C. Murphy et al., How are Java Software Developers Using the Eclipse IDE?, 2006 IEEE, [Retrieved on Aug. 18, 2016]. Retrieved from the internet: <URL: http://ieeexplore.ieee.org/stamp/stamp.jsp?tp=&arnumber=1657944> 8 Pages. (76-83).*

(Continued)

*Primary Examiner* — Thuy Dao
*Assistant Examiner* — Anibal Rivera
(74) *Attorney, Agent, or Firm* — Steven M. Greenberg, Esq.; CRGO Law

(57) ABSTRACT

Embodiments of the invention provide a method, system and computer program product for selectable data on file viewing in a debugger. A method includes specifying a file in a user interface of a debugger executing in memory of a computer and debugging a target application and determining whether to view data in the file from a perspective of the computer or the target application. The method additionally includes loading the data in the file directly from the computer externally to the target application in response to determining to view the data in the file from the perspective of the computer, but otherwise loading the data through operations performed by the debugger on behalf of the target application in response to determining to view the data in the file from the perspective of the target application. Finally, the method includes displaying the loaded data in a file viewer of the user interface of the debugger.

8 Claims, 1 Drawing Sheet

(56) References Cited

U.S. PATENT DOCUMENTS

| | | | |
|---|---|---|---|
| 7,979,847 B2* | 7/2011 | Danton | G06F 11/3644 |
| | | | 717/117 |
| 8,131,523 B1 | 3/2012 | Yunt et al. | |
| 8,327,332 B2 | 12/2012 | Sutanto et al. | |
| 8,880,952 B1* | 11/2014 | Labonte | G06F 11/3664 |
| | | | 714/38.1 |
| 2002/0046396 A1* | 4/2002 | Knoll | G06F 11/3664 |
| | | | 717/124 |
| 2002/0066071 A1* | 5/2002 | Tien | G06F 8/20 |
| | | | 717/102 |
| 2003/0081003 A1* | 5/2003 | Kutay | G06F 8/10 |
| | | | 715/762 |
| 2005/0022167 A1* | 1/2005 | Gryko | G06F 11/3664 |
| | | | 717/124 |
| 2006/0048098 A1* | 3/2006 | Gatlin | G06F 11/321 |
| | | | 717/124 |
| 2007/0006155 A1* | 1/2007 | Maennel | G06F 11/3664 |
| | | | 717/124 |
| 2008/0244547 A1* | 10/2008 | Wintergerst | G06F 11/3466 |
| | | | 717/158 |
| 2011/0023019 A1* | 1/2011 | Aniszczyk | G06F 9/445 |
| | | | 717/128 |
| 2011/0029953 A1* | 2/2011 | Pouyollon | G06F 11/3624 |
| | | | 717/124 |
| 2012/0151452 A1* | 6/2012 | Zinkovsky | G06F 11/362 |
| | | | 717/129 |
| 2014/0101488 A1* | 4/2014 | Conroy | G06F 11/3664 |
| | | | 714/38.1 |

OTHER PUBLICATIONS

Andrew J. Ko et al., Debugging Reinvented: Asking and Answering Why and Why Not Questions about Program Behavior, May 2008, [Retrieved on Aug. 18, 2016]. Retrieved from the internet: <URL: http://ieeexplore.ieee.org/stamp/stamp.jsp?tp=&arnumber=4814141> 10 Pages (301-310)*

List of IBM Patents or Patent Applications Treated as Related, Aug. 31, 2015, pp. 1-2.

* cited by examiner

SELECTABLE DATA ON FILE VIEWING IN A DEBUGGER

BACKGROUND OF THE INVENTION

Field of the Invention

The present invention relates to software debugging and more particularly to data viewing during software debugging.

Description of the Related Art

In computer software development, the process of debugging is the process of locating and fixing or bypassing errors in computer program code. Debugging techniques range from the manual observation of the performance of a computer program, to the embedding within the computer program debugging statements, to the more sophisticated automated management of a debugging session utilizing an separate, debugging tool. Traditional debugging tools are either standalone tools, or tools included as part of an integrated development environment ("IDE"). Debugging tools incorporated within an IDE have been part and parcel of software development for over a quarter century.

Debugging a traditional stand alone application involves loading the target application into memory and executing selected instructions of the target application through the debugger. Ascertaining the state of any data processed within the target application can be achieved through a debugger view of the data elements of the target application. Ascertaining the state of persisted data processed by a target application can be nearly as simple to the extent that the persisted data becomes persisted by the target application in real time. So much, however, is not the case with a transaction based target application, for instance a multi-user database driven application. In the latter instance, while data elements may have changed within the target application processing space, the changed data elements may not commit to fixed storage until some time later—even if for a brief period of time.

When debugging a transaction based target application, it may be necessary to see the data on file. As would be understood by one of skill in the art, a file is an aggregation of data on a storage medium such as the content of a database, content referenced by direct addressing on a direct access storage device ("DASD"), the content of a traditional hierarchical file system ("HFS") and the like. Outside of the execution of the target application, one can view the content of the data on file by externally loading the content of the file in memory and inspecting the content. So much is referred to as the "system view" of the file. However, the state of the file as viewed from the perspective of the system may not be synchronized with that of the file as viewed from the perspective of the target application due to the commit scope of the target application.

The disparity of views of the same file from the system perspective and the application perspective can be problematic for several reasons. First, when the end user works with a commit scope, the user may need to know what the data looks like on the system, i.e. to all users, not just to the end user. Otherwise, the end user may make incorrect decisions while debugging the target application if the end user does not understand the data present on the system. Also, the target application may have updated a file in a commit scope, and closed that file. The end user may need to know what the data is on the file before the commit scope is closed.

BRIEF SUMMARY OF THE INVENTION

Embodiments of the present invention address deficiencies of the art in respect to software debugging and provide a novel and non-obvious method, system and computer program product for selectable data on file viewing in a debugger. In an embodiment of the invention, a method for selectable data on file viewing in a debugger is provided. The method includes specifying a file in a user interface of a debugger executing in memory of a computer and debugging a target application and determining whether to view data in the file from a perspective of the computer or the target application. The method additionally includes loading the data in the file directly from the computer externally to the target application in response to determining to view the data in the file from the perspective of the computer, but otherwise loading the data in the file through operations performed by the target application in response to determining to view the data in the file from the perspective of the target application. Finally, the method includes displaying the loaded data in a file viewer of the user interface of the debugger.

In one aspect of the embodiment, the data in the file is loaded twice, once directly from the computer and once indirectly through operations performed by the target application, and presented separately in two different file viewers of the user interface of the debugger. Further, the differences in the data in the file of each of the two different file viewers can be visually emphasized respectively in each of the two different file viewers. In another aspect of the embodiment, modifications to the data in the file can be accepted through the file viewer and the modifications can be written to the data to the file directly from the computer externally to the target application in response to determining to view the data in the file from the perspective of the computer, but otherwise the modification to the data can be written to the file through operations performed by the debugger on behalf of the target application in response to determining to view the data in the file from the perspective of the target application.

In another embodiment of the invention, a debugging data processing system is configured for selectable data on file viewing. The system includes a host computing system that has at least one computer with memory and at least one processor. The system also includes fixed storage coupled to the host computing system that stores both a target application and also a file containing data written by way of directives of the target application. The system yet further includes a debugger executing in the memory of the host computing system and debugging the target application. Finally, the system includes a selectable data on file viewing module coupled to the debugger.

The module includes program code enabled upon execution in the memory of the host computing system to specify the file in a user interface of the debugger and to determine whether to view data in the file from a perspective of the host computing system or the target application. The program code also is enabled to load the data in the file directly from the fixed storage externally to the target application in response to determining to view the data in the file from the perspective of the host computing system, but otherwise loading the data in the file from the fixed storage through operations performed by the debugger on behalf of the target application in response to determining to view the data in the file from the perspective of the target application. Finally, the program code is enabled to display the loaded data in a file viewer of the user interface of the debugger.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for selectable data on file viewing in a debugger. In accordance with an embodiment of the invention, an end user can select within a debugger executing in memory of a computer a selectable control of a view of data on file for a transaction based target application subject to debugging in the debugger. If the end user selects a system view, the data on file for the target application can be viewed externally through direct manipulation of the file and presented within a file viewer of the debugger. Otherwise, if the end user selects an application view, the data on file for the target application can be viewed through the indirect manipulation of the file through the target application by invoking file manipulation directives of the debugger on behalf of the target application and presented within the file viewer of the debugger. Optionally, dual file viewers can be rendered in the debugger, one presenting the data on file from the system view and the other presenting the data on file from the application view. Differences between both views can be visually emphasized in each of the dual file viewers. In this way, the data on file of the target application can be viewed in a manner most helpful from the perspective of the debugging end user.

Figure 1:
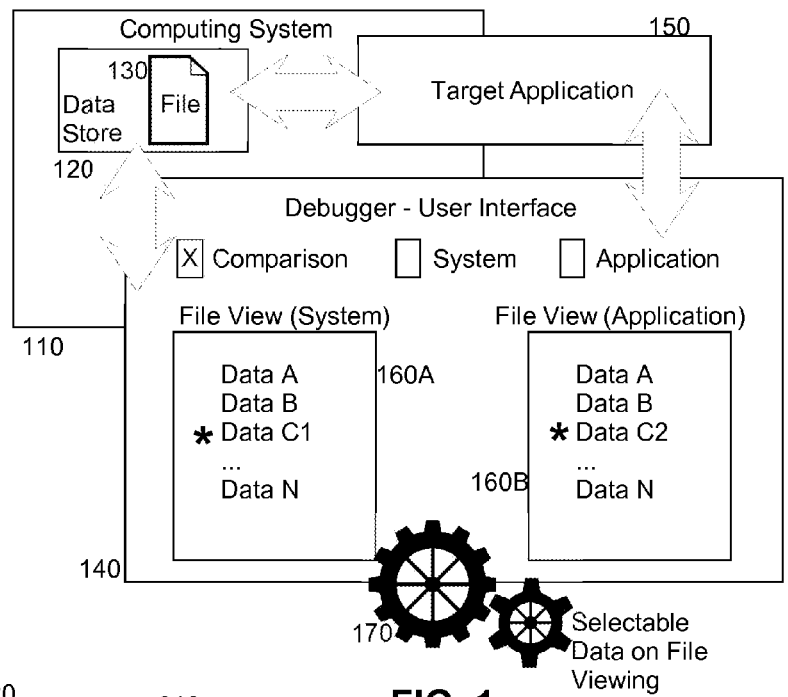
FIG. 1 is a pictorial illustration of a process for selectable data on file viewing in a debugger.

In further illustration, FIG. 1 pictorially shows a process for selectable data on file viewing in a debugger. As shown in FIG. 1, a computing system 110 can include a data store 120 in which a file 130 is stored. In this regard, the data store 120 can be a directory in a file system, or a database in a database management system. The file 130 can include data created, accessed and updated by a target application 150 enabled to execute in the computing system 110. A debugger 140 can execute in the computing system 110. The debugger 110 can include a set of user interface controls with which a selection can be specified of whether to display the data on file 130 from a perspective of the computing system 110 in a file viewer 160A, or whether to display the data on file 130 from a perspective of the target application 150 in a file viewer 160B. Optionally, the user interface controls can allow a selection to display the data on file 130 from both perspectives in separate file viewers 160A, 160B with the differences therebetween visually emphasized.

Based upon the selection in the user interface controls of the debugger 140, selectable data on file viewing logic 170 can alternately load the content of the file 130 externally to the target application 150 directly from the data store 120 through the computing system 110, or internally through the target application 150 utilizing data retrieval operations presented by the target application 150. Likewise, based upon the selection in the user interface controls of the debugger 140, selectable data on file viewing logic 170 can alternately save changes to the content of the file 130 externally to the target application 150 directly to the data store 120 through the computing system 110, or internally through the debugger 140 on behalf of the target application 150 utilizing a data write operation presented by the target application 150. Optionally, based upon the selection in the user interface controls of the debugger 140, selectable data on file viewing logic 170 can present the content of the file 130 in two different ones of the file viewers 160A, 160B, the file viewer 160A presenting the content as retrieved directly through the computing system 110, the file viewer 160B presenting the content as retrieved indirectly through target application 150, the content in each file viewer 160A, 160B visually emphasizing differences therebetween.

Figure 2:
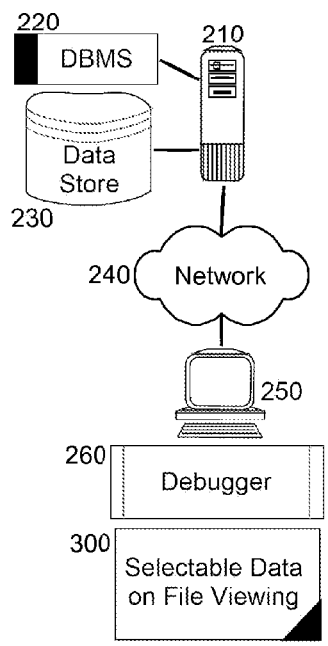
FIG. 2 is a schematic illustration of a debugger data processing system configured for selectable data on file viewing; and, FIG. 3 is a flow chart illustrating a process for selectable data on file viewing in a debugger.

The process described in connection with FIG. 1 can be implemented in a debugger data processing system. In further illustration, FIG. 2 schematically shows a debugger data processing system configured for selectable data on file viewing. The system can include a host computing system 210 that can include one or more computers, each with memory and at least one processor. A data store 230 including fixed storage can be coupled to the host computing system 210 and can include different files stored therein, the files containing data content. Optionally, a database management system 220 can execute in the host computing system 210, can be included as part of the data store 230, and can moderate access to the files in the data store 230.

Of note, a debugger 260 can execute in the memory of a computer 250 communicatively coupled to the host computing system 210 over a computer communications network 240. The debugger 260 can be configured to perform software debugging of a target application (not shown) that accesses the content of files in the data store 230 in a transactional mode. A selectable data on file viewing module 300 can be coupled to the debugger 260. The module 300 can include program code enabled upon execution to present in a user interface of the debugger a selection of viewing data on file for a target application under test in the debugger 260 from a system perspective or application perspective.

The program code of the module 300 additionally is enabled upon execution to read the data on file directly from the data store 230 externally to the target application, or indirectly through the target application dependent upon the selection of viewing presented in the user interface of the debugger 260. Even yet further, the program code of the module 300 additionally is enabled upon execution to write data modified in a file viewer of the debugger 260 directly to the data store 230 externally to the target application, or indirectly through the debugger 260 on behalf of the target application dependent upon the selection of viewing presented in the user interface of the debugger 260.

Figure 3:
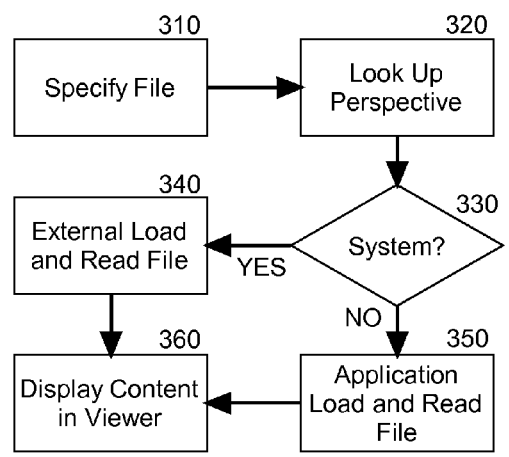

In even yet further illustration of the operation of the selectable data on file viewing module, FIG. 3 is a flow chart illustrating a process for selectable data on file viewing in a debugger debugging a target application. Beginning in block 310, a file can be specified in a user interface control of a debugger. In block 320, a perspective selection can be determined from a set of user interface controls in the debugger. In decision block 330, if the perspective is selected to be a system perspective, in block 340 the content of the file can be retrieved externally to the target application and directly through the host computing system. Otherwise, in block 350 the content of the file can be retrieved internally to the target application utilizing the data retrieval operations defined by the target application by way of the debugger acting on behalf of the target application. In either case, in block 360 the retrieved content can be presented in a file viewer of the debugger.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A debugging data processing system configured for selectable data on file viewing, the system comprising:
   a host computing system comprising at least one computer with memory and at least one processor;
   fixed storage coupled to the host computing system and storing both a target application and also a file containing data written by way of directives of the target application;
   a debugger executing in the memory of the host computing system and debugging the target application; and,
   a selectable data on file viewing module coupled to the debugger, the module comprising program code enabled upon execution in the memory of the host computing system to specify the file in a user interface of the debugger, to determine whether to view data in the file from a perspective of the host computing system or the target application, to load the data in the file directly from the fixed storage externally to the target application in response to determining to view the data in the file from the perspective of the host computing system, but otherwise loading the data in the file from the fixed storage through operations performed by the debugger on behalf of the target application in response to determining to view the data in the file from the perspective of the target application, and to display the loaded data in a file viewer of the user interface of the debugger.

2. The system of claim 1, wherein the data in the file is loaded twice, once directly from the host computing system and once indirectly through operations performed by the target application, and presented separately in two different file viewers of the user interface of the debugger.

3. The system of claim 2, wherein differences in the data in the file of each of the two different file viewers are visually emphasized respectively in each of the two different file viewers.

4. The system of claim 1, wherein the program code is further enabled to accepting modifications to the data in the file through the file viewer and to write the modifications to the data to the file directly from the host computing system externally to the target application in response to determining to view the data in the file from the perspective of the host computing system, but otherwise to write the modification to the data to the file through operations performed by the debugger on behalf of the target application in response to determining to view the data in the file from the perspective of the target application.

5. A computer program product for selectable data on file viewing in a debugger, the computer program product comprising a computer readable storage medium having program instructions embodied therewith, the program instructions executable by a device to cause the device to perform a method comprising:
   specifying a file in a user interface of a debugger executing in memory of a computer and debugging a target application;
   determining whether to view data in the file from a perspective of the computer or the target application;
   loading the data in the file directly from fixed storage of the computer externally to the target application in response to determining to view the data in the file from the perspective of the computer, but otherwise loading the data in the file from the fixed storage through operations performed by the target application in response to determining to view the data in the file from the perspective of the target application; and,
   displaying the loaded data in a file viewer of the user interface of the debugger.

6. The computer program product of claim 5, wherein the data in the file is loaded twice, once directly from the computer and once indirectly through operations performed by the target application, and presented separately in two different file viewers of the user interface of the debugger.

7. The computer program product of claim 6, wherein differences in the data in the file of each of the two different file viewers are visually emphasized respectively in each of the two different file viewers.

8. The computer program product of claim 5, wherein the method further comprises:
   accepting modifications to the data in the file through the file viewer; and, writing the modifications to the data to the file directly from the computer externally to the target application in response to determining to view the data in the file from the perspective of the computer, but otherwise writing the modification to the data to the file through operations performed by the debugger on behalf of the target application in response to determining to view the data in the file from the perspective of the target application.

* * * * *